(12) United States Patent
Lugmayer

(10) Patent No.: US 8,234,962 B2
(45) Date of Patent: Aug. 7, 2012

(54) SAW BUDDY

(76) Inventor: Clive A. J. Lugmayer, West Columbia, SC (US)

(*) Notice: Subject to any disclaimer, the term of this patent is extended or adjusted under 35 U.S.C. 154(b) by 902 days.

(21) Appl. No.: 12/291,726

(22) Filed: Nov. 14, 2008

(65) Prior Publication Data
US 2010/0122618 A1 May 20, 2010

(51) Int. Cl.
B27B 13/04 (2006.01)

(52) U.S. Cl. .................. 83/709; 83/796; 30/380

(58) Field of Classification Search ............ 83/469, 83/481, 483, 490, 491, 508.1, 698.11, 698.41, 83/859, 574, 709, 788.796, 798, 813, 809; 30/380
See application file for complete search history.

(56) References Cited

U.S. PATENT DOCUMENTS

| | | | | |
|---|---|---|---|---|
| 2,596,524 A * | 5/1952 | Bridwell | ................. | 83/563 |
| 3,401,724 A * | 9/1968 | Kreitz | ................. | 83/471.3 |
| 3,763,733 A * | 10/1973 | Jambor | ................. | 83/766 |
| 3,952,622 A | 4/1976 | Majus | | |
| 3,961,550 A | 6/1976 | Oliver et al. | | |
| 4,127,046 A * | 11/1978 | Jackson | ................. | 83/798 |
| 4,214,498 A * | 7/1980 | Zukas et al. | ................. | 83/796 |
| 4,538,494 A * | 9/1985 | Wirfelt | ................. | 83/796 |
| 4,611,521 A * | 9/1986 | McCardle | ................. | 83/796 |
| 4,648,301 A * | 3/1987 | Scott | ................. | 83/464 |
| 4,676,465 A * | 6/1987 | Myotte | ................. | 248/126 |
| 4,726,274 A * | 2/1988 | Pitoni et al. | ................. | 83/745 |
| 4,757,735 A * | 7/1988 | Olson | ................. | 83/797 |
| 4,779,503 A * | 10/1988 | Mitchell | ................. | 83/796 |
| 4,823,666 A * | 4/1989 | Galloway | ................. | 83/788 |
| 4,848,758 A * | 7/1989 | Mills | ................. | 269/16 |
| 4,907,778 A * | 3/1990 | Rockwell | ................. | 248/676 |
| 4,977,938 A * | 12/1990 | Greeson | ................. | 144/154.5 |
| 4,981,129 A * | 1/1991 | Osterman et al. | ................. | 125/21 |
| 5,251,525 A * | 10/1993 | Galloway | ................. | 83/574 |
| 5,366,071 A * | 11/1994 | Laszlo | ................. | 206/218 |
| 5,568,758 A * | 10/1996 | Moore | ................. | 83/745 |
| 5,746,193 A * | 5/1998 | Swan | ................. | 125/13.03 |
| 6,334,380 B1 * | 1/2002 | Huang | ................. | 83/471.2 |
| 6,666,245 B2 * | 12/2003 | LaBahn et al. | ................. | 144/367 |
| 7,159,499 B1 * | 1/2007 | Lanser | ................. | 83/796 |
| 7,237,585 B2 * | 7/2007 | McKnight | ................. | 144/34.1 |
| 2002/0162441 A1 * | 11/2002 | Dumas | ................. | 83/796 |
| 2003/0047050 A1 * | 3/2003 | Onose et al. | ................. | 83/469 |
| 2003/0094084 A1 * | 5/2003 | DeWitt | ................. | 83/574 |
| 2003/0094086 A1 * | 5/2003 | LaBahn et al. | ................. | 83/796 |
| 2007/0089584 A1 * | 4/2007 | Howard | ................. | 83/477.2 |
| 2007/0101851 A1 * | 5/2007 | McIntosh et al. | ................. | 83/788 |
| 2007/0251370 A1 * | 11/2007 | Hsieh | ................. | 83/745 |

* cited by examiner

Primary Examiner — Sean Michalski
(74) Attorney, Agent, or Firm — Kenneth R. Rice

(57) ABSTRACT

A folding mounting base is provided to convert a portable hand tool such as a portable band saw into a fixed tool which may be used on a workbench. The mounting base has upper and lower cradles, the upper cradle folding down next to the lower cradle for storage. In use, the handle of the portable tool in placed in the upper and lower cradles, and held in position by a toggle clamp. The toggle clamp engages the hand tool trigger to maintain the tool in an operating condition.

20 Claims, 2 Drawing Sheets

SAW BUDDY

BACKGROUND OF THE INVENTION

This invention relates, in general, to a mounting base for converting a hand held tool to a fixed tool, and, in particular, to a foldable mounting base for converting a portable band saw to a fixed band saw.

DESCRIPTION OF THE PRIOR ART

In the prior art various types of devices have been proposed.

U.S. Pat. No. 5,251,525 to Galloway discloses a cradle for supporting a band saw in a vertical position with a clamp for operating the trigger. A clamp and a trigger lock are used to secure the portable band saw to the cradle in the preferred embodiment. A second embodiment uses only the trigger lock to secure the band saw to the cradle. The cradle does not fold into a storage position.

U.S. Pat. No. 4,823,666 to Galloway discloses a cradle for supporting a band saw in a vertical position with a clamp for operating the trigger. A thumb screw and a trigger lock are used to secure the portable band saw to the cradle. The cradle does not fold into a storage position.

U.S. Pat. No. 3,961,550 to Oliver et al discloses a cradle for supporting a band saw in a vertical position. The band saw is clamped onto the cradle, and a trigger lock is provided.

U.S. Pat. No. 3,952,622 to Majus discloses a clamp device for mounting a portable band saw on a work shop type vice.

SUMMARY OF THE INVENTION

The present invention is directed to a folding mounting base which is used to mount a portable band saw to a workbench.

It is an object of the present invention to provide a new and improved mounting base to which the band saw can be easily attached and removed.

It is an object of the present invention to provide a new and improved mounting base which can be folded for easy and convenient storage when not in use.

These and other objects and advantages of the present invention will be fully apparent from the following description, when taken in connection with the annexed drawings.

DESCRIPTION OF THE PREFERRED EMBODIMENT

The preferred embodiment herein described is not intended to be exhaustive or to limit the invention to the precise form disclosed. It is chosen and described to best explain the invention so that others, skilled in the art to which the invention pertains, might utilize its teachings.

Figure 1:
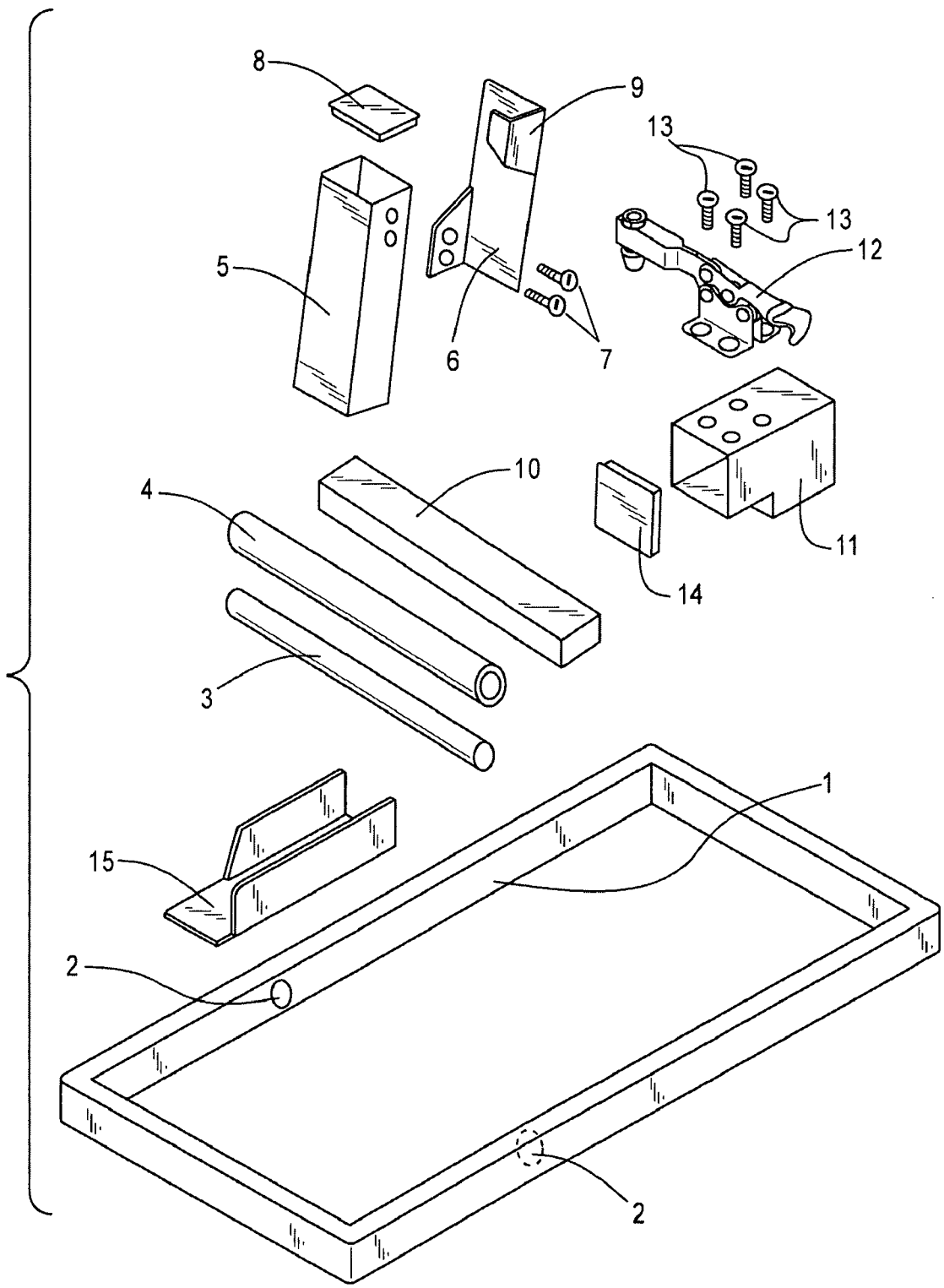
FIG. 1 is an exploded view of the present invention showing all the parts.

Referring now to the drawings in greater detail, FIG. 1 shows the individual components of the Saw Buddy. A rectangular base (1) is provided with two pivot holes (2) on opposing inside surfaces. An inner shaft (3) is inserted into a pivoting outer shaft (4) and then into the pivot holes (2). An upright support arm (5) is connected to the outer shaft (4). An upper cradle (6) is attached to the upright support arm (5) by two bolts (7). An end cap (8) is inserted into the open end of the upright support arm (5). The upper cradle (6) is provided with a tab (9) which retains a band saw handle (xx) in position. A stop block (10) is fastened to the base (1) near the inner shaft (3) to provide support for the upright support arm (5) when it is in use. A trigger lock support (11) is mounted to the base (1). The trigger lock support (11) is mounted above where the inner shaft (3) and stop block (10) are fastened to the base (1). A trigger lock (12) is fastened to the trigger lock support (11) by four bolts (13). The trigger lock is a commercially available toggle clamp such as the model CJ-350-HTC made by Carr-Lane Manufacturing Company. An end cap (14) is inserted into the open end of the trigger lock support (11). The lower cradle (15) is connected to the base (1). All components may be connected together by welding, nuts and bolts, or other suitable means.

Figure 2:
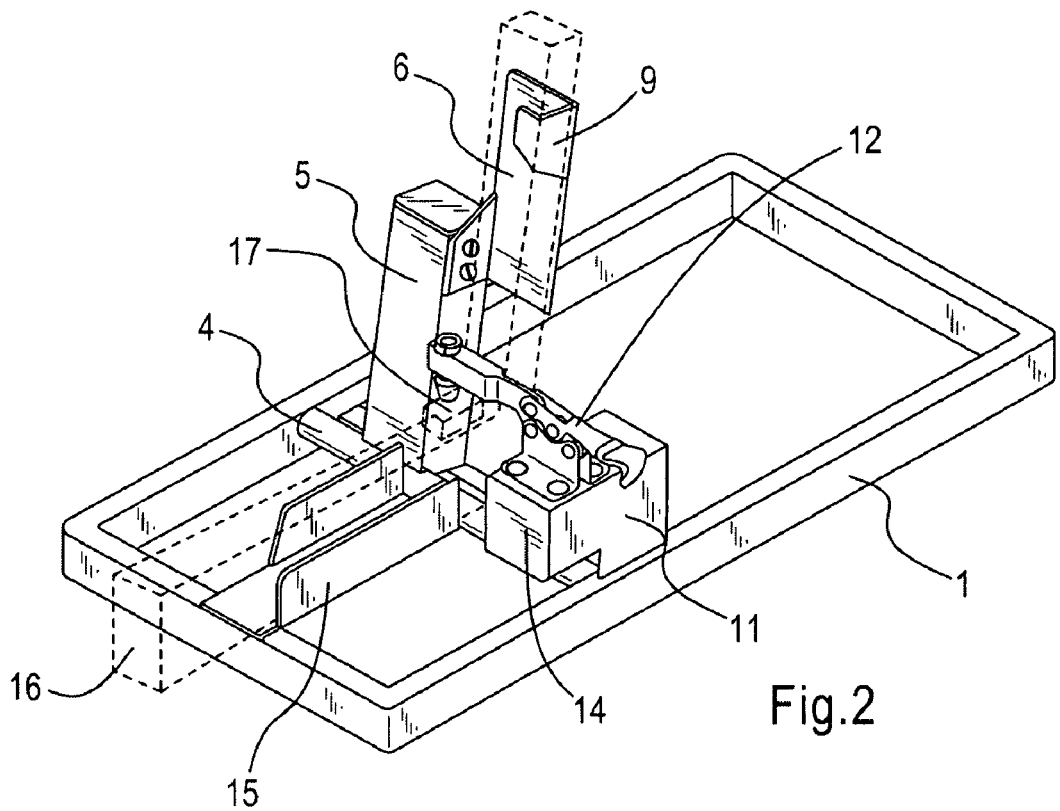
FIG. 2 is a perspective view of the present invention showing it in the in-use position.

FIG. 2 shows the assembled Saw Buddy with the handle (16) of a portable band saw in the installed position. The handle (16) is placed at an angle into the area of the retainer tab (9). The handle (16) is then rotated to a vertical orientation so it is trapped by the retainer tab (9). Then the handle is allowed to slide down to rest in the lower cradle (15). Once in position, the trigger lock (12) is closed to place pressure on the band saw trigger (17) maintaining the trigger (17) in an on position, and fixing the handle (16) onto the Saw Buddy. The power cord for the portable band saw may be plugged into a foot switch to provide safe operation of the band saw while mounted in the Saw Buddy.

Figure 3:
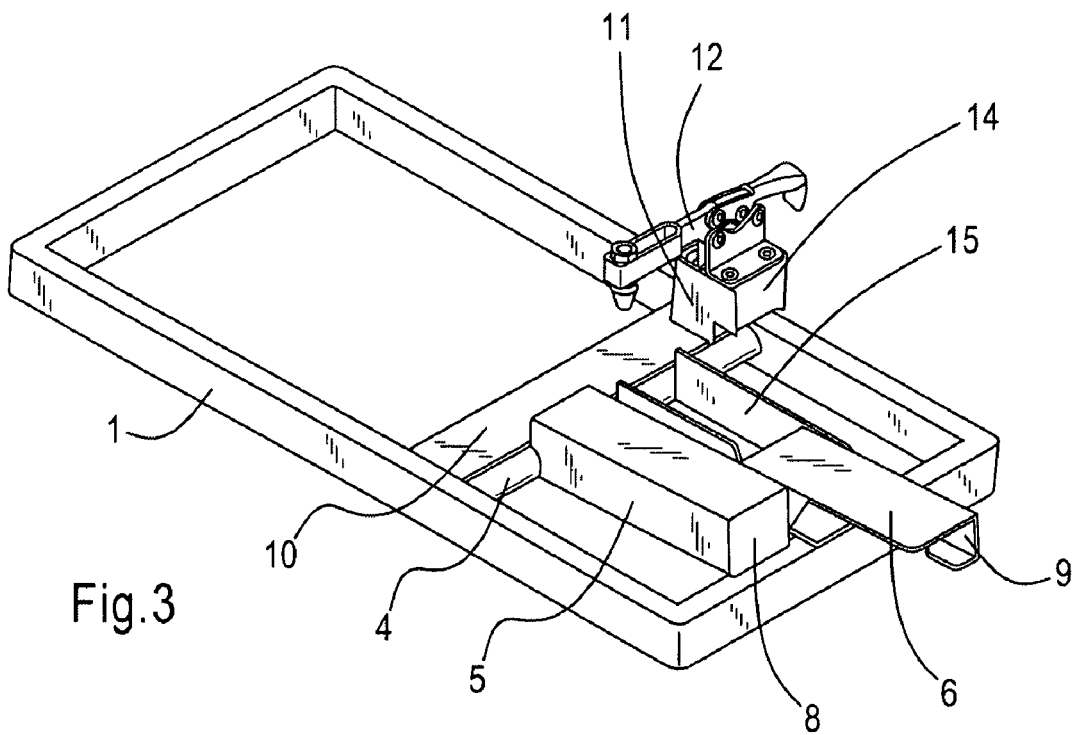
FIG. 3 is a perspective view of the present invention showing it folded for storage.

FIG. 3 shows the Saw Buddy in the storage position. The upright support arm (5) and upper cradle (6) are rotated about the inner shaft (3) to a position in which the upper cradle (6) is resting on the lower cradle (15).

Although the Saw Buddy and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

I claim:

1. A mounting base for mounting a hand held tool having a handle to a workbench comprising:
    a base,
    a pivot member comprising an inner shaft inserted into holes in opposing sides of said base member, an outer shaft through which said inner shaft is inserted, said outer shaft pivoting upon said inner shaft,
    an upper cradle connected to said outer shaft,
    a lower cradle connected to said base,
    a locking member comprising a moveable portion and a non-moveable portion, said non-moveable portion being connected to said base,
    wherein said upper and lower cradles are for holding a hand held tool handle, and said locking member is for immobilizing said hand held tool handle in said upper and lower cradles.

2. The mounting base as claimed in claim 1, further comprising a stop member connected to said base, said stop member providing a rest for said upper cradle.

3. The mounting base as claimed in claim 1, wherein said upper cradle pivots down to a position next to said lower cradle to provide a storage configuration.

4. The mounting base as claimed in claim 1, wherein said moveable portion of said locking member is configured to engage a trigger on a hand tool mounted in said upper and lower cradles to maintain said hand tool in an operating condition.

5. The mounting base as claimed in claim 1, wherein said locking member comprises a toggle clamp.

6. The mounting base as claimed in claim 1, further comprising a retainer tab on said upper cradle for holding a hand held tool handle in position.

7. The mounting base as claimed in claim 1, further comprising a support member connected on said base, said non-moveable portion of said locking member being connected to said support member.

8. The mounting base as claimed in claim 1, further comprising a support arm connected to said outer shaft and said upper cradle.

9. The mounting base as claimed in claim 1, wherein a portable band saw is mounted inside said upper and lower cradles, and held in position by said locking member.

10. A mounting base for mounting a hand held tool having a handle to a workbench comprising:
a base,
a pivot member pivotally connected to said base,
an upper cradle connected to said pivot member,
a lower cradle connected to said base,
a locking member comprising a moveable portion and a non-moveable portion, said non-moveable portion being connected to said base,
a support arm connected to said pivot member and said upper cradle
wherein said upper and lower cradles are for holding a hand held tool handle, and said locking member is for immobilizing said hand held tool handle in said upper and lower cradles.

11. The mounting base as claimed in claim 10, further comprising a stop member connected to said base, said stop member providing a rest for said upper cradle.

12. The mounting base as claimed in claim 10, wherein said upper cradle pivots down to a position next to said lower cradle to provide a storage configuration.

13. The mounting base as claimed in claim 10, wherein said moveable portion of said locking member is configured to engage a trigger on a hand tool mounted in said upper and lower cradles to maintain said hand tool in an operating condition.

14. The mounting base as claimed in claim 10, wherein said locking member comprises a toggle clamp.

15. The mounting base as claimed in claim 10, further comprising a retainer tab on said upper cradle for holding a hand held tool handle in position.

16. The mounting base as claimed in claim 10, further comprising a support member connected on said base, said non-moveable portion of said locking member being connected to said support member.

17. The mounting base as claimed in claim 10, wherein said pivot member comprises an inner shaft inserted into holes in opposing sides of said base member, an outer shaft through which said inner shaft is inserted, said outer shaft pivoting upon said inner shaft, and said outer shaft is connected to said upper cradle.

18. The mounting base as claimed in claim 10, wherein a portable band saw is mounted inside said upper and lower cradles, and held in position by said locking member.

19. A mounting base for mounting a hand held tool having a handle to a workbench comprising:
a base,
an inner shaft which is inserted into holes in opposing sides of said base member,
an outer shaft through which said inner shaft is inserted, said outer shaft pivoting upon said inner shaft,
an upper cradle connected to said outer shaft pivot member,
a retainer tab on said upper cradle to hold said hand tool in position,
a stop member is connected to said base, said stop member providing a rest for said upper cradle,
a lower cradle connected to said base,
a support member connected to said base,
a locking member comprising a moveable portion and a non-moveable portion, said non-moveable portion being connected to said base,
wherein said upper and lower cradles are for holding a hand held tool handle,
wherein said moveable portion of said locking member is for immobilizing said hand held tool handle in said upper and lower cradles, and for holding a trigger of said hand held tool in an on position, and
wherein said upper cradle pivots down to a position next to said lower cradle to provide a storage configuration.

20. The mounting base as claimed in claim 19, wherein a portable band saw is mounted inside said upper and lower cradles, and held in position by said locking member.

* * * * *